United States Patent [19]

Suzuki et al.

[11] Patent Number: 4,614,416
[45] Date of Patent: Sep. 30, 1986

[54] OPERATION CONTROL DEVICE FOR CAMERA

[75] Inventors: Toyotosi Suzuki, Tokyo; Toru Nagata, Yokohama, both of Japan

[73] Assignee: Canon Kabushiki Kaisha, Tokyo, Japan

[21] Appl. No.: 750,643

[22] Filed: Jun. 27, 1985

Related U.S. Application Data

[63] Continuation of Ser. No. 546,053, Oct. 27, 1983, abandoned.

[30] Foreign Application Priority Data

Oct. 29, 1982 [JP] Japan ................................ 57-191071

[51] Int. Cl.⁴ ........................... G03B 1/18; G03B 3/10; G03B 9/64
[52] U.S. Cl. ................................ 354/400; 354/234.1; 354/173.1
[58] Field of Search .......................... 354/400, 435–440, 354/230, 234.1, 235.1, 237–240, 261–266, 267.1, 402, 403, 405, 173.1, 173.11

[56] References Cited

U.S. PATENT DOCUMENTS

| | | | |
|---|---|---|---|
| 3,868,712 | 2/1975 | Biber | 354/234.1 |
| 3,922,698 | 11/1975 | Petersen | 354/235.1 |
| 4,107,705 | 8/1978 | Hashimoto et al. | 354/440 |
| 4,212,522 | 7/1980 | Kitai et al. | 354/234.1 X |
| 4,217,049 | 8/1980 | Kitai et al. | 354/400 |
| 4,348,094 | 9/1982 | Hirohata et al. | 354/234.1 |
| 4,396,267 | 8/1983 | Hirohata et al. | 354/400 |

*Primary Examiner*—William B. Perkey
*Attorney, Agent, or Firm*—Toren, McGeady, Stanger, Goldberg & Kiel

[57] ABSTRACT

A device for controlling the operation of a camera includes a speed governing member arranged to be operated by a driving force differing from a driving force used for driving shutter blades. The opening speed of the shutter blades is stably controlled by the speed governing member. The control device retards the speed of a shutter blade opening action to enable an automatic focusing action to be performed before the photo-taking aperture actually begins to open after commencement of the shutter blade opening action.

18 Claims, 6 Drawing Figures

OPERATION CONTROL DEVICE FOR CAMERA

This is a continuation of application Ser. No. 546,053, filed Oct. 27, 1983, now abandoned.

BACKGROUND OF THE INVENTION

1. Field of the Invention

This invention relates to an operation control device for a camera and more perticularly to a control mechanism which controls the opening action of shutter blades.

2. Description of the Prior Art

It has been known that an exposure control circuit can be greatly simplified for reduction in cost and that the degree of accuracy of exposure control can be improved to a great extent by an arrangement which makes the shutter opening characteristic (or relation of the open area to the opening time) arbitrarily adjustable to the characteristic of the exposure control circuit.

Therefore, for example, in the case of electromagnetically driven shutters arranged to directly open and close shutter blades by the reciprocative movement of a driving member which has a coil secured thereto, there have been proposed various methods for making the shutter opening characteristic arbitrarily adjustable. For example, Japanese Patent Publication No. SHO 51-5577 discloses a method of controlling the opening characteristic of a shutter by actuating a governor mechanism arranged to be responsive to the above-stated driving member. However, in accordance with this method, an electromagnetic driving force developed at the driving member is used to directly actuate the governor mechanism. Therefore, in order to stably operate the governor, the electromagnetic driving force to be applied to the driving member must be sufficiently large. Accordingly, this necessitates supply of a large current. This presents a problem as it is extremely difficult to supply such a large current from the output of batteries provided inside the camera body. Further, the supply of such a large current is not desirable as it shortens the lives of the batteries.

In the case of a camera of the kind incorporating therein an automatic focusing mechanism which is arranged to automatically bring a photographic lens into an in-focus state on the other hand, it is generally necessary to interrelate the automatic focusing (hereinafter called AF) mechanism with a shutter mechanism in such a way as to have an exposure begin after completion of an automatic focusing action. For this purpose, in a prior art method, the shutter mechanism has been arranged to be allowed to begin to operate by mechanically detecting completion of shifting of the photographic lens. In another prior art method, a timer circuit is arranged to begin a time defining action concurrently with commencement of a focusing action and a shutter mechanism is caused by this timer circuit to begin to operate after completion of the focusing action.

These methods of the prior art, however, have been unsatisfactory as they inevitably complicate the structural arrangement and the control circuit of a camera.

SUMMARY OF THE INVENTION

A first object of the present invention is to provide an operation control device for a camera having a speed governing member which is operated by a driving force differing from a driving force used for the shutter blades and is arranged to stably control the opening speed of the shutter blades.

A second object of the invention is to provide an operation control device for a camera wherein the above-stated speed governing member is arranged to lengthen a period of time between commencement of a shutter blade opening action and commencement of actual opening of a photo-taking aperture; and wherein an automatic focusing action of a photographic lens is arranged to be carried out within this period to ensure, with a simple structural arrangement, that an exposure is performed after completion of the automatic focusing action.

These and further objects and features of the invention will become apparent from the following detailed description of a preferred embodiment thereof taken in conjunction with the accompanying drawings.

DETAILED DESCRIPTION OF THE PREFERRED EMBODIMENT

Figure 1:
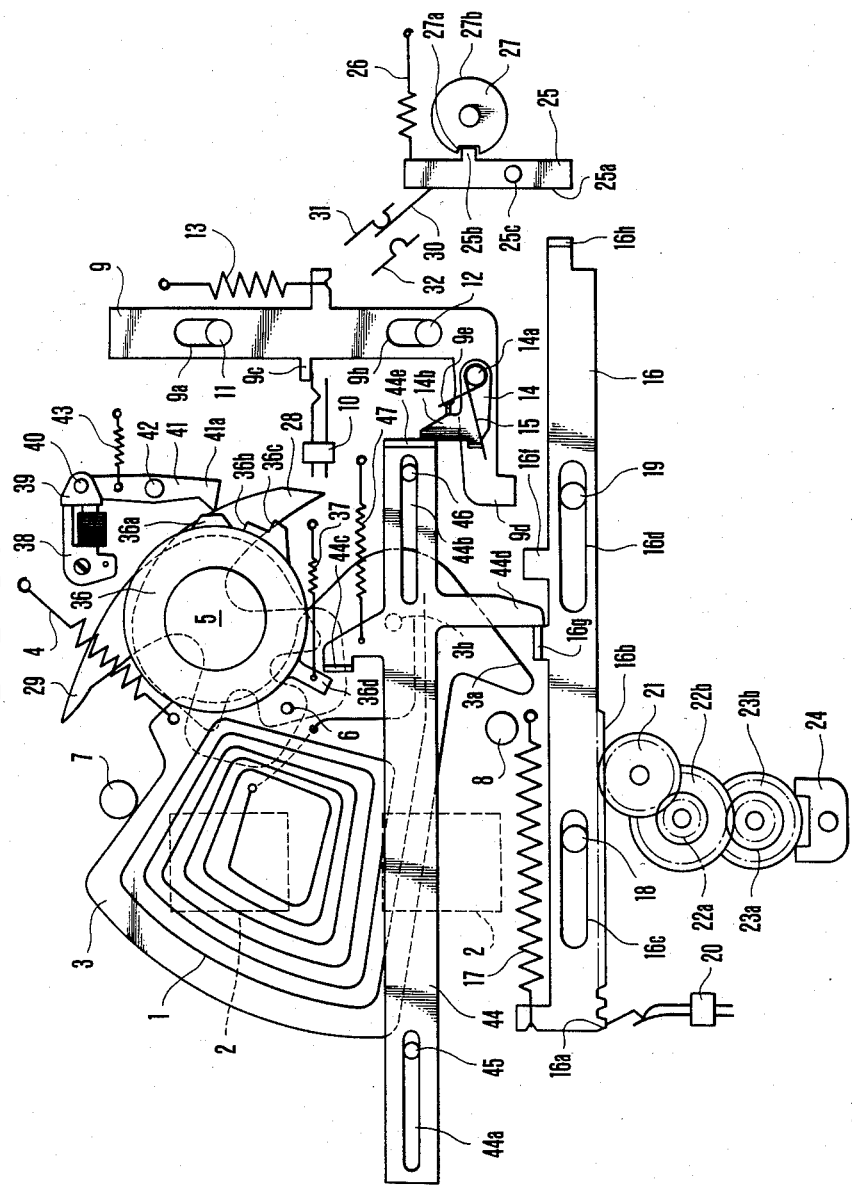
FIGS. 1 and 2 are plan views of an embodiment of the present invention, FIG. 1 showing it after having completed preparation for a photographing operation and FIG. 2 in the process of carrying out an exposure.

The following description deals with a preferred embodiment of the invention with reference to the accompanying drawings. Referring to FIG. 1 which shows an embodiment of the invention as in a state of having completed preparation for a photographing operation, the illustration includes a coil 1 which is composed of a conductor; magnets 2 which are arranged to form magnetic fields with magnetic fluxes arranged to be produced perpendicularly to the surface of the drawing and to have their polarity arranged opposite to each other; and a rotor 3 which has the coil 1 secured to the surface thereof and is arranged to serve as a driving member. The rotor 3 is pivotally carried by a support shaft 3b which is secured to the body of a camera which is not shown. A spring 4 urges the rotor 3 to turn clockwise. Under the illustrated condition, however, the rotor 3 is restrained from turning with one side thereof abutting on a pin 7. A photo-taking aperture 5 is arranged to be opened and closed by means of shutter blades 28 and 29 which serve also as stop means. A connection pin 6 connects the rotor 3 to the shutter blades 28 and 29 and is arranged to have the shutter blades 28 and 29 moved in an opening direction by a counterclockwise turning movement of the rotor 3 to which the connection pin 6 is secured. The shutter blades 28 and 29 are pivotally supported by the camera body which is not shown.

A stopper pin 8 is arranged to restrict the counterclockwise rotation of the rotor 3 by abutting on one side thereof. A shutter release lever 9 which is urged by a spring 13 to move upward is provided with slots 9a and 9b. The slots 9a and 9b slidably engage support shafts 11 and 12 which are secured to the camera body to permit the release lever 9 to be vertically movable as viewed in the drawing. A switch 10 is arranged to allow power supply to begin to an exposure control circuit and an AF control circuit which are not shown when the switch 10 is closed by a projection 9c of the release lever 9. A clamp lever 14 is pivotally carried by a support shaft 14a in the middle part of a locking arm 9d of the release lever 9. The clamp lever 14 is urged to turn clockwise by a torsion coil spring 15. Under the condition shown, however, the clamp lever 14 is prevented from turning with one side thereof engaging a bent-up part 9e of the release lever 9.

The embodiment includes a set plate 16 which serves as a speed governing member. The set plate 16 is provided with slots 16c and 16d which are slidably engaged with support shafts 18 and 19 secured to the camera body. This arrangement permits the set plate 16 to move to the left and right as viewed in the drawing. A spring 17 urges the set plate 16 to move to the right. However, under the condition shown, a bent-up part 16g of the plate 16 engages a locking arm 44d of a lens barrel set plate 44, which will be described later herein, to inhibit the plate 16 from moving to the right as viewed in the drawing. The set plate 16 is provided with an end part 16a which is arranged to turn a switch 20 on coming to abut on a contact piece of the switch 20 and a bent-up part 16f which is engageable with the locking arm 9d of the release lever 9. When the rotor 3 turns counterclockwise, a projection 3a of the rotor 3 come to abut on the bent-up part 16g of the plate 16. When the switch 20 turns off, the above-stated exposure control circuit counts exposure time.

The set plate 16 is further provided with a rack 16b which is formed on the plate 16 and is arranged to engage a gear 21. When the set plate 16 moves, gears 21, 22a, 22b and 23a and an escape wheel 23b engaging an anchor 24 which is rotatably carried by the camera body are caused to rotate accordingly as the plate 16 moves. The rotation of the gear 21 is transmitted in an increased speed to the escape wheel 23b and then the anchor 24 acts to have these parts jointly serve as a governor to adjust the moving speed of the set plate 16 to a prescribed speed.

An indexing plate 27 for feeding film (not shown) to a predetermined extent rotates counterclockwise accordingly as a sprocket rotates. When the sprocket makes one turn upon completion of film winding to an extent corresponding to one frame, the plate 27 likewise makes one turn. A groove 27a is formed in a part of the circumference 27b of the indexing plate 27. The projection 25b of a control lever 25 which is provided for controlling power supply to a motor is arranged to fit in this groove 27a. The control lever 25 is pivotally carried by a support shaft 25c and is urged to turn clockwise by a spring 26. To the control lever 25 is secured a switch contact piece 30 which forms a power supply switch. Under the condition shown, the contact piece 30 is in contact with a switch contact piece 31. When the control lever 25 turns counterclockwise with one side 25a of the lever 25 pushed by an end part 16h of the set plate 16, the switch contact piece 30 comes into contact with another switch contact piece 32.

Figure 6:
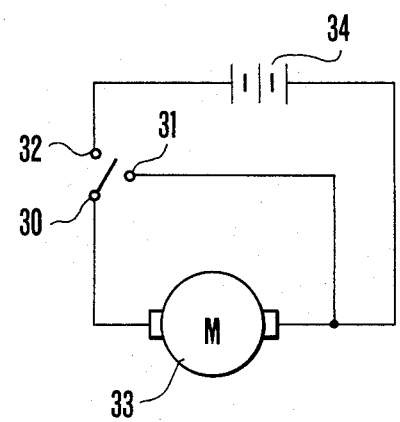
FIG. 6 is a circuit diagram showing the electrical connection of a motor control circuit of the embodiment.

Referring to FIG. 6, the embodiment is provided with a motor 33 for charging a film feeding mechanism, an automatic focusing (AF) mechanism and a shutter mechanism. A power source 34 effects power supply to the motor 33 with the above-stated switch contact piece 30 coming into contact with the switch contact piece 32. The switch contact piece 30 comes in contact with another switch contact piece 31 and the two terminals of the motor 33 are short-circuited to quickly stop the motor from rotating when the power supply to the motor 33 is cut off.

Again referring to FIG. 1, a lens barrel 36 carries a photographic lens. The lens barrel 36 is arranged to be movable in the direction of the optical axis of the lens via a draw-out cam (not shown) by turning it around the optical axis. The photographic lens (not shown) is thus arranged to be shiftable along the optical axis by turning the lens barrel 36. The lens barrel 36 is provided with a cam 36a for charging a locking lever 41 to be in the position shown. Stoppers 36b and 36c are arranged to control the turning extent of the lens barrel 36, i.e. the shifting extent of the photographic lens, by engaging the claw 41a of a locking lever 41. These stoppers 36b and 36c are disposed on the periphery of the lens barrel and are movable together with the lens barrel 36. The locking lever 41 is pivotally carried by a support shaft 42 and is urged by a spring 43 to turn clockwise. However, under the condition shown, the lever 41 is restrained from turning with its claw 41a abutting on the crest of the charge cam 36a. There is provided an electromagnet 38 which has the timing of power supply thereto controlled by the AF control circuit (not shown). With power supply effected thereto, the electromagnet 38 attracts an armature 39 which is carried by one end of the locking lever 41 via shaft 40 against the urging force of a spring 43.

A lens barrel set plate 44 is provided with slots 44a and 44b and is carried by support shafts 45 and 46 via these slots. The lens barrel plate 44 is thus arranged to be movable to the right as viewed on the drawing and to serve as a start member. A spring 47 urges the plate 44 to move to the right. The lens barrel set plate 44 is further provided with an engaging arm 44c which engages a projection 36d disposed on the periphery of the lens barrel 36 when the lens barrel 36 is turned clockwise against the urging force of a spring 37; and an engaging arm 44d which engages the bent-up part 16g of the set plate 16. Under the condition shown in FIG. 1, the lens barrel 36 and the set plate 16 are kept in their positions shown by the engagement of these parts. Further, under this condition, a bent-up part 44e which is provided at the right end of the lens barrel set plate 44 engages the claw part 14b of the clamp lever 14. The lens barrel set plate 44 is movable by the rotation of the motor 33 via a charging mechanism (which is not shown) to the left as viewed on the drawing.

Figure 3:
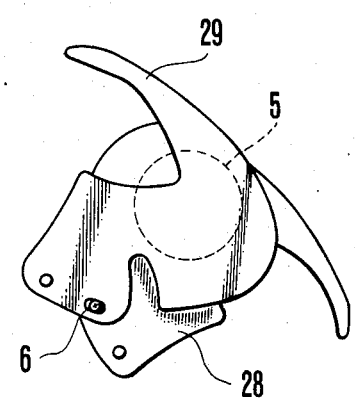
FIG. 3 is a plan view showing the condition of the shutter blades when the embodiment is in the state of FIG. 1.
Figure 4:
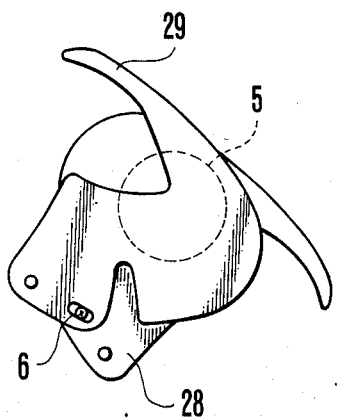
FIG. 4 is a plan view showing the condition of the shutter blades when power supply to a coil begins.

With the embodiment in the condition as shown in FIG. 1, when the release lever 9 is depressed downward as viewed on the drawing, the projection 9c of the release lever 9 turns the switch 10 on. With the switch 10 turned on, power supply begins to the exposure control circuit and the AF control circuit. Then, the electromagnet 38 attracts the armature 39. Power supply to the coil 1 also begins. At the coil 1, an electromagnetic force which turns the rotor 3 in the counterclockwise direction is produced by the action of the magnetic field of the magnet 2. This causes the rotor 3 to turn counterclockwise against the urging force of the spring 4. At that time, however, the set plate 16 has not begun to move as yet. The bent-up part 16g of the set plate 16 is still kept in its initial position. The rotor 3, therefore, is temporarily stopped once at a point where it abuts on the bent-up part 16g. Further, at that time, although the shutter blades 28 and 29 are somewhat moved in the opening direction (that is, they are somewhat shifted from the condition of FIG. 3 to that of FIG. 4) by the turning movement of the rotor 3, the photo-taking aperture 5 still remains in a closed state as the turning movement of the rotor 3 is made only to a slight extent. In other words, the shutter blades 28 and 29 never open the photo-taking aperture while the set plate 16 is in the position shown in the drawing.

After this, when the release lever 9 is further depressed, the claw part 14b of the clamp lever 14 disengages from the bent-up part 44e of the lens barrel set plate 44. Meanwhile, the locking arm 9d of the release lever 9 moves into a position where the arm 9d can engage the bent-up part 16f of the set plate 16. With the lens barrel set plate 44 thus released from the locking engagement with the clamp lever 14, the urging force of the spring 47 causes the lens barrel set plate 44 to move rightward as viewed on the drawing. The rightward movement of the lens barrel set plate 44 simultaneously disengages the lens barrel 36 and the set plate 16 from the locking arms 44c and 44d of the lens barrel set plate 44. The spring 37 then causes the lens barrel 36 to turn counterclockwise while the spring 17 causes the set plate 16 to move rightward as viewed on the drawing.

Figure 2:
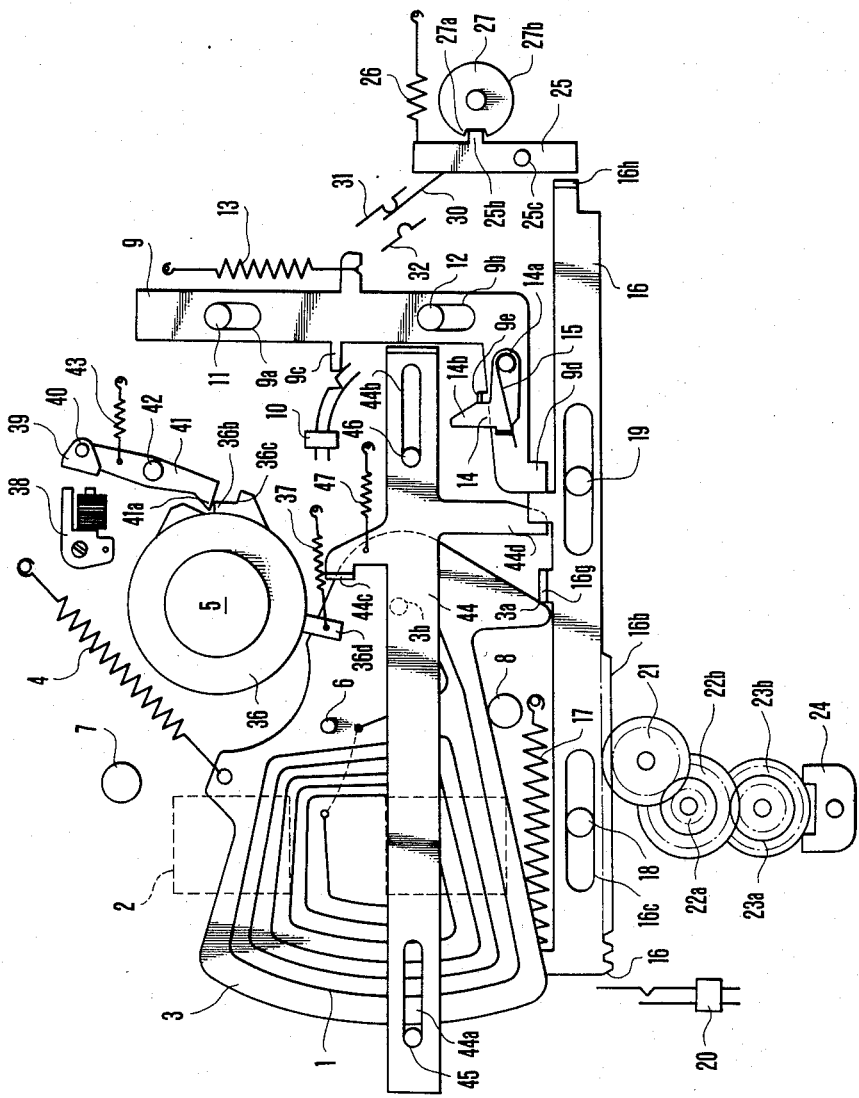

The turn of the lens barrel 36 first disengages the cam 36a from the claw 41a of the locking lever 41. Then, the spring 43 urges the locking lever 41 to turn clockwise. However, when an object to be photographed is located at a long distance, power supply to the electromagnet 38 is maintained by the above-stated AF control circuit until the claw 41a of the locking lever 41 becomes engageable with the long distance side stopper 36c of the lens barrel 36. Such being the arrangement, the locking lever 41 is kept in the position shown against the urging force of the spring 43 when the object is located at a long distance. If the object is located at a short distance on the other hand, the above-stated AF control circuit cuts off power supply to the electromagnet 38 immediately after the switch 10 turns on. Therefore, with the object located at a long distance, the lens barrel 36 is stopped from turning by engagement between the stopper 36c and the claw 41a of the locking lever 41. With the object located at a short distance, the lens barrel 36 is stopped from turning by engagement between the stopper 36b and the claw 41a of the locking lever 41 and thus comes to a stop in a position as shown in FIG. 2.

Meanwhile, with the lens barrel set plate 44 beginning to move, the set plate 16 also begins to move rightward as viewed on the drawing. However, the moving speed of the set plate 16 is controlled by the escape wheel 23b and the anchor 24 and thus becomes slower than the speed of the lens barrel set plate 44 and the turning speed of the lens barrel 36 which moves in response to the lens barrel set plate 44. Further, the moving speed of the set plate 16 is arranged to be slower than the speed at which the rotor 3 is caused to turn counterclockwise by the electromagnetic force. Therefore, with the set plate 16 moving rightward as viewed on the drawing, the rotor 3 turns counterclockwise at a speed lower than the turning speed of the lens barrel 36 in a state of having its end part 3a abutting on the bent-up part 16g of the set plate 16. Then, after the lens barrel 36 is stopped from turning, the shutter blades 28 and 29 begin to open the photo-taking aperture 5. In other words, in this specific embodiment, the speed of the opening action of the shutter blades 28 and 29 is controlled to be lower than the moving speed of the photographic lens by means of the governor consisting of the escape wheel 23b and the anchor 24 although the opening action of the shutter blades 28 and 29 begins concurrently with the movement of the lens. As a result, an exposure begins after completion of the shift of the photographic lens. Further, in this embodiment, the shutter blades 28 and 29 are overlapped to a relatively great extent and the moving speed of the set plate 16 is adjusted by the governor, so that the opening characteristic of the shutter can be adjusted as desired.

When the photo-taking aperture 5 begins to open as a result of the movement of the set plate 16, the switch 20 which has been turned on by the pressure of the end part 16a of the set plate 16 turns off. With the switch 20 turned off, the exposure control circuit which is not shown begins to count exposure time on the basis of the output of the light sensitive element arranged to measure a light coming from the object to be photographed. Further, with the switch 20 turned off, a timer circuit (not shown) which is composed of a CR time constant circuit, etc. begins a time defining action. In the case where a signal for stopping power supply to the coil 1 is not produced from the exposure control circuit even after the lapse of a predetermined period of time, say, 60 m. sec, after the shutter blades 28 and 29 have opened due to excessively low brightness of the object to be photographed, the timer circuit produces a signal for stopping the power supply to the coil 1 in place of the exposure control circuit. The timer circuit thus serves to determine a length of time called terminating time. In other words, in this particular embodiment, power supply to the coil 1 is cut off either by a signal produced from the exposure control circuit or by a signal produced from the timer circuit whichever is produced earlier. The details of such circuit arrangement are well known, for example, from Japanese Patent Application Laid-Open No. SHO 54-139730, etc. and therefore require no further description.

Figure 5:
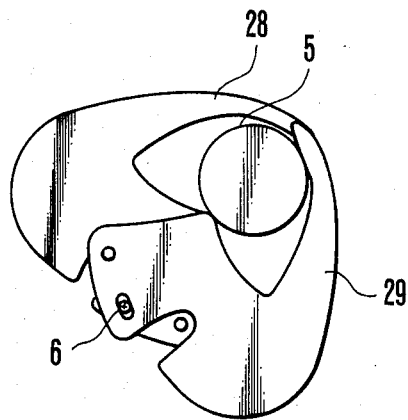
FIG. 5 is a plan view showing the shutter blades in a fully open state.

The rightward movement of the set plate 16 causes the shutter blades 28 and 29 to gradually open. When an appropriate length of exposure time is counted within the above-stated predetermined time by the exposure control circuit with the object having a sufficient degree of brightness, power supply to the coil 1 is cut off. At that instant, the electromagnetic force which has been exerted on the rotor 3 disappears to allow the rotor 3 to be turned clockwise by the urging force of the spring 4. This causes the shutter blades 28 and 29 to close. Further, when the rotor 3 abuts on the stopper pin 8 to bring the shutter blades 28 and 29 into a full open state, the shutter blades 28 and 29 remain in the full open state as shown in FIG. 5 until the power supply to the coil 1 comes to an end irrespective of further movement of the set plate 16.

Further, the rightward movement of the set plate 16 temporarily comes to a stop at a point where the bent-up part 16f of the set plate 16 engages the locking arm 9d of the release lever 9. After completion of the exposure, the release lever 9 is moved upward as viewed in the drawing by the urging force of the spring 13 when the lever 9 is released from the downward depressing operation. With the release lever 9 thus brought back to its original position, the bent-up part 16f of the set plate 16 is desengaged from the locking arm 9d. Accordingly, the set plate 16 then resumes its rightward movement. The fore end 16h of the set plate 16 then pushes the side face 25a of the control lever 25 to cause the control lever 25 to turn counterclockwise. This disengages the switch contact piece 30 from the contact piece 31 and brings it into contact with another contact piece 32. Referring to FIG. 6, with the switch contact piece 30 thus shifted to the contact piece 32, power supply is effected to the motor 33 to render it operative. At that instant, the control lever 25 retracts its projection 25b from the groove 27a of the indexing plate 27. The driving force of the motor 33 turns the sprocket which is not shown to feed the film. Meanwhile, a charging mechanism which is not shown causes the lens barrel set plate 44 to move leftward as viewed on the drawing. With the lens barrel set plate 44 thus shifted leftward from the position shown in FIG. 2, the locking arm 44c comes to engage the projection 36d of the lens barrel 36 to charge the lens barrel 36 by turning it clockwise. Meanwhile, the locking arm 44d comes to engage the bent-up part 16g of the set plate 16 to move the set plate 16 leftward as viewed on the drawing. The clockwise turn of the lens barrel 36 causes the cam 36a to push the claw 41a of the locking lever 41. The locking lever 41 turns counterclockwise to cause the armature 38 to abut on the electromagnet 38.

When the set plate 16 is moved leftward, the control lever 25 is released from the pressure exerted on its side face 25a. The urging force of the spring 26 then urges the control lever 25 to turn clockwise. However, since the indexing plate 27 is turning in association with the turn of the sprocket at that time, the projection 25b of the control lever 25 comes to abut on the outer circumference 27b of the indexing plate 27 to prevent the lever 25 from turning clockwise. The switch contact piece 30 is, therefore, kept in contact with the contact piece 32.

When the lens barrel set plate 44 is further charged leftward as viewed on the drawing, the bent-up part 44e of the lens barrel set plate 44 comes to abut on a slanting face of the claw 14b of the clamp lever 14 and thus comes to push the claw 14b along the slanting face. As a result, the clamp lever 14 turns counterclockwise against the urging force of the torsion coil spring 15. After allowing the bent-up part 16e to pass therethrough, the clamp lever is caused by the torsion coil spring 15 to turn clockwise until it comes to engage the bent-up part 9e of the release lever 9. Following this, when the lens barrel 36 and the set plate 16 have been completely charged and the lens barrel set plate 44 is released from the force moving it leftward as viewed in the drawing, the spring 17 brings the lens barrel set plate 44 to a point where the bent-up part 44e engages the clamp lever 14 and the lens barrel set plate 44 resumes its original state. After that, with both the sprocket and the indexing plate 27 make one turn with one frame portion of film having been wound up, the projection 25b of the control lever 25 comes to fit in the groove 27a of the indexing plate 27. This causes the control lever 25 to turn clockwise. As a result, the switch contact piece 30 shifts from the contact piece 32 to the contact piece 31 to cut off power supply to the motor 33 and to promptly stop the motor from rotating by short-circuiting the terminals of the motor 33. A film winding operation is completed by this and the whole embodiment comes to the state of having completed preparation for photographing as shown in FIG. 1.

While, in this embodiment, the moving speed of the set plate 16 is arranged to be controlled by the escape wheel 23b and the anchor 24, this control may be carried out by means of, for example, eddy current of a fly-wheel or the like.

In accordance with this invention, as has been described in detail, a speed governing member is arranged to control the operation of a shutter driving member which drives the shutter blades to open; and the speed governing member is arranged to be operated by a driving force differing from the driving force of the shutter driving member. Therefore, the speed governing member is never operated directly by the above-stated shutter driving member, so that the shutter blade opening speed can be very stably controlled. Particularly, where the shutter driving member is arranged to be operated by an electromagnetic force, the current to be used for generating the electromagnetic force can be reduced. The opening characteristic of the shutter blades can be adjusted as desired. Further, even when the current to be used for generating the electromagnetic force comes to fluctuate, the opening speed of the shutter blades still remains stable. The operation control device for a camera according to the invention, therefore, contributes to energy economization and yet permits highly accurate exposure control.

Further, in accordance with the invention, the opening speed of the shutter blades is retarded by means of the speed governing member; and, despite the concurrent commencement of a focusing action and a shutter blade opening action, the photo-taking aperture is arranged to begin to open after completion of the focusing action. Therefore, the commencement of an exposure after completion of the focusing action can be ensured by a extremely simple structural arrangement. Besides, the operation control device makes a camera free from erroneous actions.

Since the focusing action and the shutter blade opening action are arranged to begin concurrently with each other in accordance with the invention, this arrangement effectively eliminates the possibility that no exposure action begins after completion of the focusing action.

Further, since the above-stated speed governing member is arranged to be in a position to inhibit the shutter from being opened in response to the forward movement of the shutter driving member prior to a shutter release operation, any erroenous shutter operation can be prevented without fail before a shutter release operation.

Further, in accordance with the invention, a film winding start switch is arranged to be closed at the end of movement of the speed governing member while the speed governing member is inhibited from moving to the above-stated end position when the shutter release means is depressed. This arrangement, therefore, effectively prevents a film winding operation from being performed during a photo-taking process.

What we claim:

1. An operation control device for a camera having a photographic aperture, comprising:
   (a) shutter means for opening and closing said photographic aperture of said camera;
   (b) electromagnetic driving means for driving said shutter means to a released position by an electromagnetic force; and
   (c) speed governing means for controlling a release action of said shutter means, said speed governing means being shifted by a driving force different from the electromagnetic force of said electromagnetic driving means in a direction in which said electromagnetic force operates, wherein the release action of said shutter means follows the shifting movement of said speed governing means.

2. An operation control device according to claim 1, wherein said speed governing means includes an elastic member for shifting to a direction in which the electromagnetic force of the electromagnetic driving means works.

3. An operation control device according to claim 1, wherein said speed governing means includes control means for controlling the shutter means only when said shutter means opens.

4. An operation control device according to claim 1, wherein said speed governing means includes inhibiting means for inhibiting the release action of the shutter means during a period of time when a shutter release action is not done.

5. An operation control device for a camera, comprising:
(a) electromagnetic shifting means shifted by an electromagnetic force for effecting operation of said camera; and
(b) speed governing means for controlling the shifting operation by said electromagnetic force of the electromagnetic shifting means, said speed governing means being shifted to a direction in which the electromagnetic force operates by a driving force different from that of the electromagnetic force of the electromagnetic shifting means, wherein the shifting operation of the electromagnetic shifting means follows the shifting operation of said speed governing means.

6. An operation control device for a camera including a photographic aperture, comprising:
(a) electromagnetically driven shutter means shifted by an electromagnetic force for effecting opening of said photographic aperture by its shifting operation; and
(b) speed governing means for controlling said opening action of the electromagnetically driven shutter means, said speed governing means shifting to a direction in which said electromagnetic force operates by a driving force different from the electromagnetic force of the electromagnetically driven shutter means wherein the opening action of said electromagnetically driven shutter means follows the shifting operation of said speed governing means.

7. An operation control device for a camera, comprising:
(a) drive means for driving a photographic optical system to change the focusing position of said photographic optical system,
(b) focal point adjusting means for stopping said photographic optical system driven by said drive means at an in-focus position,
(c) shutter means for performing an exposure operation,
(d) speed adjusting means for adjusting the operational speed of said shutter means, said speed adjusting means being arranged to delay the operational speed of said shutter means without restricting the moving speed of said photographic optical system so that the photographic optical system driven by said drive means is stopped by said focal point adjusting means at the in-focus position before the shutter means starts actual exposure after commencement of the operation of said shutter means.

8. A device according to claim 7, further including start means for allowing said drive means for said photographic optical system means and said shutter means to begin to operate concurrently with each other.

9. A device according to claim 8, wherein said speed adjusting means includes a governor which determines the speed of the opening action of said shutter means.

10. A device according to claim 9, wherein said speed adjusting means includes a drive source for operating said speed governing means with a driving force differing from that of said shutter means.

11. A device according to claim 10, wherein said speed adjusting means includes an elastic member which serves as said drive source.

12. A device according to claim 11, wherein said shutter means includes a coil for generating an electromagnetic force, said coil being arranged in a magnetic field to drive said shutter blades with the electromagnetic force.

13. A device according to claim 12, wherein said speed adjusting means includes an operation control means which controls the operation of said shutter means only when said shutter blades are to be opened.

14. A device according to claim 13, wherein said speed adjusting means includes an inhibiting means which inhibits the opening action of said shutter blades while no shutter release operation is performed.

15. An operation control device for a camera, comprising:
(a) shutter means for opening and closing a photo-taking aperture of the camera;
(b) shutter driving means for driving said shutter means;
(c) speed governing means for controlling the operation of said shutter driving means, said speed governing means being arranged to be moved at a constant speed by a driving force differing from the driving force of said shutter driving means;
(d) switch means for allowing a film winding operation to begin, said switch means being arranged to operate in association with the movement of said speed governing means; and
(e) release means for performing shutter release by a depressing operation, said release means including locking means which is arranged such that, when the release means is under the depressing operation, said speed governing means is prevented halfway in the movement thereof from moving further in such a way as to inhibit said switch means from operating and that, when the release means is released from said depressing operation, said speed governing means is allowed to move further.

16. A device according to claim 15, wherein said speed governing means includes an elastic member to be used for the operation of said speed governing means.

17. A device according to claim 16, wherein said shutter driving means includes a coil for generating an electromagnetic force, said coil being arranged in a magnetic field to drive said shutter means with the electromagnetic force.

18. A device according to claim 17, wherein said speed governing means includes an operation control member which controls the operation of said shutter driving means only when said shutter means are to be opened.

* * * * *